United States Patent
Raphaël et al.

(10) Patent No.: US 12,432,019 B2
(45) Date of Patent: Sep. 30, 2025

(54) OMAMRC TRANSMISSION METHOD AND SYSTEM WITH VARIATION IN THE NUMBER OF USES OF THE CHANNEL

(71) Applicant: Orange, Issy-les-Moulineaux (FR)

(72) Inventors: Visoz Raphaël, Chatillon (FR); Ali Al Khansa, Chatillon (FR); Stefan Cerovic, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 316 days.

(21) Appl. No.: 17/924,030

(22) PCT Filed: May 11, 2021

(86) PCT No.: PCT/FR2021/050823
§ 371 (c)(1),
(2) Date: Nov. 8, 2022

(87) PCT Pub. No.: WO2021/229183
PCT Pub. Date: Nov. 18, 2021

(65) Prior Publication Data
US 2023/0261812 A1    Aug. 17, 2023

(30) Foreign Application Priority Data
May 12, 2020 (FR) .................................. 2004643

(51) Int. Cl.
*H04L 5/00* (2006.01)
*H04L 1/00* (2006.01)

(52) U.S. Cl.
CPC .......... *H04L 5/0005* (2013.01); *H04L 1/0009* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 11,368,261 B2 | 6/2022 | Cerovic et al. | |
| 11,418,252 B2 | 8/2022 | Cerovic et al. | |
| 2013/0250776 A1* | 9/2013 | Hatefi ................ | H04B 7/15521 370/243 |

(Continued)

FOREIGN PATENT DOCUMENTS

| | | | | |
|---|---|---|---|---|
| WO | WO-2013093361 A1 * | 6/2013 | ......... | H04B 7/15528 |
| WO | WO-2018229362 A1 * | 12/2018 | ......... | H04B 7/15542 |
| WO | 2019162592 A1 | 8/2019 | | |

OTHER PUBLICATIONS

Abdulaziz Mohamad et al., "Practical Joint Network-Channel Coding Schemes for Slow-Fading Orthogonal Multiple-Access Multiple-Relay Channels", 2014, Globecom, pp. 1-6.*

(Continued)

*Primary Examiner* — Adnan Baig
(74) *Attorney, Agent, or Firm* — David D. Brush; Westman, Champlin & Koehler, P.A.

(57) ABSTRACT

A transmission method with slow link adaptation intended for an OMAMRC telecommunication system with M sources (s1 . . . , sM), optionally L relays and a destination, M≥2, L≥0. A number of uses of the channel is allocated to each source for transmission and this number is determined by the destination during slow link adaptation for each source based on statistical knowledge of all of the channels.

10 Claims, 1 Drawing Sheet

(56) References Cited

U.S. PATENT DOCUMENTS

2016/0352454 A1* 12/2016 Zhang .................. H04L 1/0009
2018/0367254 A1* 12/2018 Mohamad ................. H04L 5/16
2020/0119804 A1    4/2020 Cerovic et al.
2021/0067284 A1    3/2021 Cerovic et al.

OTHER PUBLICATIONS

English translation of the Written Opinion of the International Searching Authority dated Aug. 24, 2021 for corresponding International Application No. PCT/FR2021/050823, filed May 11, 2021.
International Search Report dated Aug. 11, 2021 for corresponding International Application No. PCT/FR2021/050823, filed May 11, 2021.
Written Opinion of the International Searching Authority dated Aug. 11, 2021 for corresponding International Application No. PCT/FR2021/050823, filed May 11, 2021.

* cited by examiner

OMAMRC TRANSMISSION METHOD AND SYSTEM WITH VARIATION IN THE NUMBER OF USES OF THE CHANNEL

CROSS-REFERENCE TO RELATED APPLICATIONS

This Application is a Section 371 National Stage Application of International Application No. PCT/FR2021/050823, filed May 11, 2021, which is incorporated by reference in its entirety and published as WO 2021/229183 A1 on Nov. 18, 2021, not in English.

FIELD OF THE INVENTION

The present invention relates to the field of digital communications. In this field, the invention relates more particularly to the transmission of coded data between at least two sources and a destination with relaying by at least two nodes that can be relays or sources.

It is understood that a relay does not have a message to transmit. A relay is a node dedicated to the relaying of the messages from the sources while the source has its own message to transmit and can also in some cases relay the messages from the other sources, i.e. the source is in this case called cooperative.

There are many relaying techniques known as: "amplify and forward", "decode and forward", "compress-and-forward", "non-orthogonal amplify and forward", "dynamic decode and forward", etc.

The invention applies notably, but not exclusively, to the transmission of data via mobile networks, for example for real-time applications, or via, for example, networks of sensors.

Such a network of sensors is a multiuser network, composed of several sources, several relays and a recipient using a time-orthogonal multiple access scheme for the transmission channel between the relays and the destination, denoted OMAMRC ("*Orthogonal Multiple-Access Multiple-Relay Channel*").

PRIOR ART

An OMAMRC transmission system implementing a slow link adaptation is known from the application WO 2019/162592 published on Aug. 29, 2019. The content of this application is included by reference.

An OMAMRC telecommunication system has M sources, possibly L relays and a destination, $M \geq 2$, $L \geq 0$ and a time-orthogonal multiple access scheme for the transmission channel which is applied between the nodes taken from among the M sources and the L relays. The maximum number of time slots per frame transmitted is $M+T_{max}$ with M slots allocated during a first phase to the successive transmission from the M sources and $T_{used} \leq T_{max}$ slots for one or more cooperative transmissions allocated during a second phase to one or more nodes selected by the destination according to a selection strategy.

The OMAMRC transmission system considered comprises at least two sources, each of these sources being able to operate at different instants either as a source or as a relaying node. The system can possibly further comprise relays. The term node covers both a relay and a source acting as a relaying node or as a source. The system considered is such that the nodes can themselves be relays. A relay is distinguished from a source in that it does not have a message to transmit which is specific to it, i.e. it simply retransmits messages originating from other nodes.

The links between the different nodes of the system are subject to slow fading and to Gaussian white noise. The knowledge of all the links of the system (CSI: Channel State Information) by the destination is not available. Indeed, the links between the sources, between the relays, between the relays and the sources cannot directly be observed by the destination and the knowledge thereof by the destination would entail an excessive exchange of information between the sources, the relays and the destination. To limit the overhead of the return channel (feedback overhead), only information on the distribution/statistics of the channels (CDI: Channel Distribution Information) of all the links, e.g. average quality (for example average SNR, average SINR) of all the links, is assumed to be known by the destination in order to determine the bit rates allocated to the sources.

The link adaptation is of slow type, that is to say that, before any transmission, the destination allocates initial bit rates to the sources knowing the distribution of all the channels (CDI: Channel Distribution Information). In general, it is possible to work out the CDI distribution on the basis of the knowledge of the average SNR or SINR of each link of the system.

The transmissions of the messages from the sources are divided into frames during which the CSIs of the links are assumed constant (assuming slow fading). The bit rate allocation is assumed not to change during several hundreds of frames, it changes only with changes of CDI.

The method distinguishes three phases, an initial phase and, for each frame to be transmitted, a first phase and a second phase. The transmission of a frame proceeds in two phases which are possibly preceded by an additional phase, called initial phase.

During the initialization phase, the destination determines an initial bit rate for each source by taking into account the average quality (for example SNR) of each of the links of the system.

The destination estimates the quality (for example SNR) of the direct links: source to destination and relay to destination according to known techniques based on the use of reference signals. The quality of the source-source, relay-relay and source-relay links is estimated by the sources and the relays by, for example, using the reference signals. The sources and the relays transmit to the destination the average qualities of the links. This transmission takes place before the initialization phase. Only the average value of the quality of a link is taken into account, so the refreshing thereof takes place on a long timescale, that is to say over a time which makes it possible to average the rapid variations (fast fading) of the channel. This time is of the order of the time needed to cover several tens of wavelength of the frequency of the signal transmitted for a given speed. The initialization phase takes place for example every 200 to 1000 frames. The destination uploads to the sources, via a return channel, the initial bit rates that it has determined. The initial bit rates remain constant between two occurrences of the initialization phase.

During the first phase, the M sources successively transmit their message during the M time slots by respectively using modulation and coding schemes determined on the basis of the initial bit rates.

During this phase, the number $N_1$ of channel uses (i.e. resource element according to the 3GPP terminology) is fixed and identical for each of the sources.

During the second phase, the messages from the sources are transmitted cooperatively by the relays and/or by the sources. This phase lasts at most $T_{max}$ time slots. During this phase, the number $N_2$ of channel uses is fixed and identical for each of the sources.

The mutually independent sources, during the first phase, broadcast their sequences of coded information in the form of messages for the attention of a single recipient. Each source broadcasts its messages with the initial bit rate. The destination communicates to each source its initial bit rate via control channels with very limited bit rate. Thus, during the first phase, the sources transmit, each in turn, their respective message during time slots each dedicated to a source.

The sources other than that which transmits, and possibly the relays, of "HalfDuplex" type, receive the successive messages from the sources, decode them and, if they are selected, generate a message solely from the messages from the sources decoded without error.

The selected nodes then access the channel in a mutually time-orthogonal manner during the second phase to transmit their generated message to the destination.

The destination can choose the node that must transmit at a given instant.

The method implements a strategy to maximize the average metric efficiency (utility metric) in the system considered subject to the constraint of observing an individual quality of service (QoS) per source, i.e. an average individual BLER per source:

$$\eta^{sia} = \sum_{i=1}^{M} \frac{R_i}{M + \alpha \mathbb{E}(T_{used})}(1 - BLER_i) \qquad (20)$$

in which
$R_i = K_i/N_1$ represents the initial bit rate of the source i with $K_i$ the number of bits of information of the message from the source $i \in \{1, \ldots, M\}$. $R_i$ is a variable which takes discrete values taken from a finite set $\{\overline{R}_1, \ldots, \overline{R}_{n_{MCS}}\}$ with $n_{MCS}$ the number of bit rates corresponding to the different coding and modulation schemes (MCS, Modulation and Coding Scheme) available for the transmission.

$T_{used} \leq T_{max}$ gives the number of retransmissions used during the second phase, $E(T_{used})$ is the average of the number of retransmissions used during the second phase, $\alpha = N_2/N_1$ is the ratio between the number of channel uses during the second phase and the number of channel uses during the first phase, $BLER_i$ represents the block error ratio for the source i. $BLER_i$ denotes the function with multiple variables $BLER_i(R_1, \ldots, R_M)$ which depends on the current value taken by the bit rate variables $R_1, \ldots, R_M$.

The QoS constraint on the individual BLER given by the source is written: $BLER_i \leq BLER_{QoS,i}, \forall i \in \{1, \ldots, M\}$. An algorithm based on an approach without interference, or "Genie Aided" approach, is used to resolve the problem of optimization of multidimensional bit rate allocation. This approach consists in independently determining each initial bit rate of a source by assuming that all the messages from the other sources are known to the destination and the relays then in iteratively determining the bit rates by initializing their value with the values determined according to the "Genie Aided" approach. The utility metric which consists of a spectral efficiency is conditioned on the node selection strategy which takes place during the second phase.

Main Features of the Invention

The subject of the present invention is a transmission method with slow link adaptation for an OMAMRC telecommunication system according to which the number of channel uses is determined by the destination for each source, i.e. per time slot, on the basis of a knowledge of the statistical distribution of all the channels (Channel Distribution Information).

By introducing a variable number of channel uses, with slow adaptation controlled by the destination, unlike the known method for which this number is fixed, the present invention substantially enhances the performance levels of the method.

To simplify the method, only the number of channel uses for the first phase is variable, the number $N_2$ of channel uses for the second phase is fixed.

The number $N_{1,i}$ of channel uses by a source for the first phase can thus be adapted by taking account of the distribution of the channels CDI.

The distribution of the channels CDI can be based for example on the knowledge of an average SNR (or SINR, or equivalent indicator) of each of the channels, provided that all the links are considered to be mutually independent and that the fast fading follows a Gaussian distribution, i.e. a so-called Rayleigh fading. Based on the knowledge of the average SNRs, the destination aims to optimize the ratio $\alpha_i = N_2/N_{1,i}$ jointly with the transmission bit rate $R_i = K_i/N_{1,i}$ by the source i during the first phase i.

During the second phase, the destination selects, on each time slot $t \in \{1, \ldots T_{used}\}$ the node from among the sources and the relays which will transmit by using the $N_2$ channel uses.

The slow link adaptation implemented by the destination tends to maximize the average utility metric modified by the introduction of the ratio $\alpha_i = N_2/N_{1,i}$. This metric is thus a function with multiple variables which depends on the current value taken by the bit rate variables $R_1, \ldots, R_M$ and by the variables of the ratio $\alpha_1, \ldots, \alpha_M$ between the number $N_2$ of channel uses during the second phase and the number $N_{1,i}$ of channel uses during the first phase:

$$\eta^{sia}(R_1, \ldots, R_M, \alpha_1, \ldots, \alpha_M) = \qquad (21)$$
$$\sum_{i=1}^{M} \frac{R_i/\alpha_1}{\sum_{i=1}^{M} 1/\alpha_1 + \mathbb{E}(T_{used})}(1 - BLER_i(R_1, \ldots, R_M, \alpha_1, \ldots, \alpha_M))$$

According to one embodiment, since the channel uses consist of time and/or frequency resources, a variation of the number of channel uses consists of a variation of the number of resources allocated to each source which takes account of the average qualities of the channels.

According to one embodiment, the average utility metric takes into account M ratios $\alpha_i$ which are considered to be discrete values belonging to a finite set of possible values.

According to one embodiment, the values of a channel use ratio between the two phases determined for each source belong to a finite set of discrete values, preferably $\{1, 0.5, 2\}$. The method performs a maximization of the average utility metric with an initialization of the ratio for each source with the discrete value closest to an average of the values of the ratio denoted $\alpha_{GA}$ and by implementing a "Genie Aided" approach.

The "Genie Aided" approach, which consists in independently determining each bit rate of a source, assuming that all the messages from the other sources are known to the destination and assuming a ratio $\overline{\alpha}_i = N_2/N_{1,i}$ equal to $\alpha_{GA}$ $$\left( \text{or even } N_{1,i} = \frac{N_2}{\alpha_{GA}} \forall i \in \{1, \ldots, M\} \right)$$

for each source, leads to initial bit rate values for each source which are not sufficiently precise.

According to one embodiment, an iterative calculation of the initial bit rates by the destination makes it possible to correct these initial bit rate values by taking into account the selection strategy which takes place during the second phase, something that the "Genie Aided" approach, which assumes that the active node for each time slot for the second phase is chosen randomly from among the nodes, cannot intrinsically do on its own. This mode is advantageous in that it makes it possible to use a "Genie Aided" approach for the initialization of the iterative algorithm.

According to one embodiment, the cooperative transmission of a node during the second phase is reflected in the transmission of a redundancy based on an incremental coding to the sources.

According to one embodiment, the node selection strategy that takes place during the second phase follows a sequence known in advance to all the nodes.

According to one embodiment, the iterative calculation of the initial bit rates takes into account a node selection strategy (strategy with random selection, strategy with cyclic selection, etc.).

According to one embodiment, the node selection strategy that takes place during the second phase takes into account information originating from the nodes indicating their set of sources correctly decoded.

According to one embodiment, the node selection strategy that takes place during the second phase corresponds, on each time slot, to the selection of the node which has correctly decoded at least one source that the destination has not correctly decoded at the end of the preceding time slot and which benefits from the best instantaneous quality out of the instantaneous qualities of all the links between the nodes and the destination.

According to one embodiment of the invention, the message transmission method results from a software application subdivided into several specific software applications stored in the sources, in the destination and possibly in the relays. The destination can for example be the receiver of a base station. The execution of these specific software applications is suited to the implementation of the transmission method.

Also a subject of the invention is a system comprising M sources, possibly L relays, and a destination, M>1, L≥0, for an implementation of a transmission method according to the preceding subject.

Also subjects of the invention are each of the specific software applications on one or more information media, said applications comprising program instructions suitable for implementing the transmission method when these applications are executed by processors.

Also subjects of the invention are the configured memories comprising instruction codes corresponding respectively to each of the specific applications.

The memory can be incorporated in any entity or device capable of storing the program. The memory can be of ROM type, for example a CD ROM or a microelectronic circuit ROM, or even of magnetic type, for example a USB key or a hard disk.

Also, each specific application according to the invention can be downloaded from a server accessible over a network of Internet type.

The optional features presented above in the context of the transmission method can possibly be applied to the software application and to the memory described above.

LIST OF THE FIGURES

Other features and advantages of the invention will emerge more clearly on reading the following description of embodiments, given as simple illustrative and nonlimiting examples, and the attached drawings, in which.

DESCRIPTION OF PARTICULAR EMBODIMENTS

A channel use is the smallest granularity in terms of time-frequency resource defined by the system which allows the transmission of a modulated symbol. The number of channel uses is linked to the available frequency band and to the transmission time.

In the "slow fading" case prioritized in the description, the fading gains are constant during the $M+T_{max}$ time slots in which $M+T_{max}$ is the maximum number of time slots to accomplish a transmission cycle.

Figure 1:
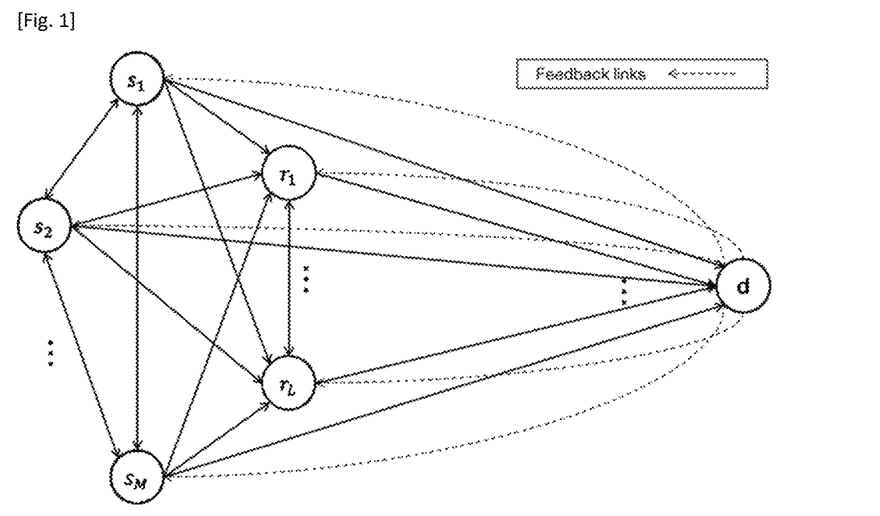
FIG. 1 is a diagram of an example of a so-called cooperative OMAMRC (Orthogonal Multiple-Access Multiple-Relay Channel) system according to the invention.
Figure 2:
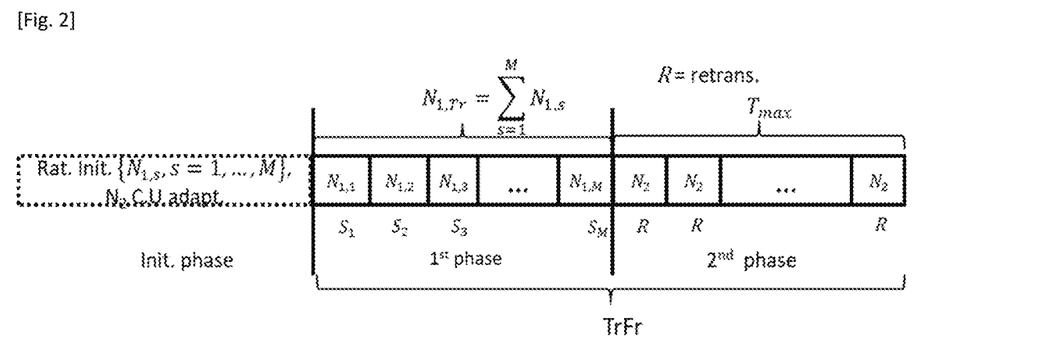
FIG. 2 is a diagram of a cycle of transmission of a frame which can be preceded by an initialization step according to the invention.

An embodiment of the invention is described in the context of an OMAMRC system illustrated by FIG. 1 and in support of the diagram of FIG. 2 which illustrates a frame transmission cycle.

This system comprises M sources which belong to the set of sources $S=\{s_1, \ldots, s_M\}$ in which, by convention to simplify the notations, $s_i=i \; \forall i \in \{1, \ldots, M\}$, L relays which belong to the set of relays $R=\{r_1, \ldots, r_L\}$ and a destination d.

Each source of the set S communicates with the single destination using the other sources (user cooperation) and the relays which cooperate.

In order to simplify the description, the following hypotheses are made hereinbelow on the OMAMRC system:
- the sources and the relays are equipped with a single transmission antenna;
- the sources, the relays and the destination are equipped with a single reception antenna;
- the sources, the relays and the destination are perfectly synchronized;
- the sources are statistically independent (there is no correlation between them);
- all the nodes transmit with the same power;
- a CRC code is used which is assumed to be included in the $K_s$ information bits of each source s to determine whether or not a message is correctly decoded;
- the links between the different nodes suffer from additive noise and fading. Fading gains are fixed during the transmission of a frame performed for a maximum duration M+$T_{max}$ time slots, but can change independently from one frame to another. $T_{max} \geq 2$ is a parameter of the system;

the instantaneous quality of the direct channel/link in reception (CSIR Channel State Information at Receiver) is available to the destination, to the sources and to the relays;

the returns are error-free (no error on the control signals).

The nodes comprise the relays and the sources which can behave as a relay when they do not transmit their own message.

The nodes, M sources and L relays, access the transmission channel according to a time-orthogonal multiple access scheme which allows them to listen without interference to the transmissions from the other nodes. The nodes operate according to a half-duplex mode.

The following notations are used:

$x_{a,k} \in R$ is the modulated symbol coded for the use of the channel k transmitted by the node $a \in S \cup R$, $y_{a,b,k}$ is the signal received at the node $b \in S \cup R \cup \{d\} \setminus \{a\}$ corresponding to a signal transmitted by the node $a \in S \cup R$, $\gamma_{a,b}$ is the average signal-to-noise ratio (SNR) which takes into account the effects of attenuation of the channel (path-loss) and of masking (shadowing), $h_{a,b}$ is the attenuation gain of the channel (fading) which follows a symmetrical circular complex Gaussian distribution with zero average and of variance $\gamma_{a,b}$, the gains are mutually independent, $n_{a,b,k}$ are samples of a Gaussian white noise (AWGN) distributed identically and independently which follow a complex Gaussian distribution of circular symmetry with zero average and of unitary variance.

$R_s$ is a variable representing the initial bit rate of the source s which can take its values from the finite set $\{\overline{R}_1, \ldots, \overline{R}_{n_{MCS}}\}$. Similarly, $\alpha_s$ is a variable representing the ratio $N_2/N_{1,s}$ which can take its values from a finite set $A = \{\overline{\alpha}_1, \ldots, \overline{\alpha}_{|A|}\}$.

The signal received at the node $b \in S \cup R \cup \{d\} \setminus \{a\}$ corresponding to the signal transmitted by the node $a \in S \cup R$ can be written:

$$y_{a,b,k} = h_{a,b} x_{a,k} + n_{a,b,k} \qquad (1)$$

During the first phase of M time slots, each source $s \in S$ transmits its code words during $N_{1,s}$ channel uses, $k \in \{1, \ldots, N_{1,s}\}$, the number $N_{1,s}$ of channel uses depending on the source s.

During the second phase of $T_{used}$, $T_{used} \leq T_{max}$, time slots, each selected node transmits information representative of the messages from the sources decoded without error by this node during $N_2$ channel uses, $k \in \{1, \ldots, N_2\}$, the number $N_2$ of channel uses being, for simplification for the method, identical between the sources $s \in S$.

By using reference signals (pilot symbols, 3GPP LTE SRS signals, etc), the destination can determine the gains (CSI Channel State Information) of the direct links: $h_{dir} = \{h_{s_1,d}, \ldots, h_{s_M,d}, h_{r_1,d}, \ldots, h_{r_L,d}\}$, that is to say of the source-to-destination and relay-to-destination links and can therefore deduce therefrom the average SNRs of these links.

By contrast, the gains of the links between sources, of the links between relays and of the links between sources and relays are not known to the destination. Only the sources and the relays can estimate a metric of these links by using reference signals in a way similar to that used for the direct links. Given that the statistics of the channels are assumed to be constant between two initialization phases, the transmission to the destination of the metrics by the sources and the relays can take place only at the same rate as the initialization phase. The statistics of the channel of each link are assumed to follow a centered circular complex Gaussian distribution and the statistics are independent between the links. It is consequently sufficient to consider only the average SNR as a measure of the statistics of a link.

The sources and the relays therefore report to the destination metrics representative of the average SNRs of the links that they can observe.

The destination thus knows the average SNR of each of the links.

During an initial link adaptation phase which precedes the transmission of several frames, the destination transmits, for each source s, a representative value (index, MCS, bit rate, etc.) of an initial bit rate $\overline{R}_i$ and a value $\overline{\alpha}_i$.

Each of the initial bit rates unambiguously determines an initial modulation and coding scheme (MCS) or, conversely, each initial MCS determines an initial bit rate.

The reporting of the initial bit rates $\overline{R}_i$ and of the ratios $\overline{\alpha}_i$ is performed via control channels with very limited bit rate.

These initial bit rates are determined by the destination so as to maximize an average utility metric, e.g. an average spectral efficiency, conditioned on the node selection strategy that takes place during the second phase and subject to the constraint of an average individual BLER for each source, this metric being modified by the introduction of the ratio $\alpha_i = N_2/N_{1,i}$, its expression is given by the equation (21).

This metric (21) is thus a function with multiple variables which depends on the current value taken by the bit rate variables $R_1, \ldots, R_M$ and by the variables of the ratio $\alpha_1, \ldots, \alpha_M$ between the number $N_2$ of channel uses during the second phase and the number $N_{1,i}$ of channel uses during the first phase:

$$\eta^{sia}(R_1, \ldots, R_M, \alpha_1, \ldots, \alpha_M) = \sum_{i=1}^{M} \frac{R_i/\alpha_1}{\sum_{i=1}^{M} 1/\alpha_1 + \mathbb{E}(T_{used})} (1 - BLER_i(R_1, \ldots, R_M, \alpha_1, \ldots, \alpha_M))$$

According to one embodiment, the average utility metric takes into account M ratios $\alpha_i$ which are considered to be discrete values belonging to a finite set of possible values.

Each source transmits to the destination its data placed in a frame using the other sources and relays. A frame occupies time slots during the transmission of the M messages from the respectively M sources. The transmission of a frame (which defines a transmission cycle) proceeds during M+$T_{used}$ time slots: M slots for the first phase of respective channel use capacities $N_{1,i}$ for each source i, $T_{used}$ slots for the second phase.

During the first phase, each source $s \in S$ transmits after coding a message $u_s$ comprising $K_s$ information bits, $u_s \in F_2^{K_s}$, $F_2$ being the two-element Galois body. The message $u_s$ comprises a code of CRC type which makes it possible to check the integrity of the message $u_s$. The message $u_s$ is coded according to the initial MCS. Given that the initial MSCs can be different between the sources, the lengths of the coded messages can be different between the sources. The coding uses a code with incremental redundancy. The code word obtained is segmented into redundancy blocks. The code with incremental redundancy can be of systematic type, the information bits are then included in the first block. Whether or not the code with incremental redundancy is of systematic type, it is such that the first block can be decoded independently of the other blocks. The code with incremental redundancy can be produced for example by means of a finite family of rate-compatible punctured linear codes or of rateless codes modified to operate with finite lengths: raptor code (RC), rate-compatible punctured turbo code (RCPTC), rate-compatible punctured convolutional code (RCPCC), rate-compatible LDPC (RCLDPC rate compatible low-density parity check code).

Thus, during the first phase, the M sources successively transmit their message during the M slots with, respectively, modulation and coding schemes determined on the basis of the values of the initial bit rates.

Since each transmitted message corresponds to a source $s \in S$, a message that is correctly decoded is, through an abuse of notation, compared to the corresponding source.

When a source transmits, the other sources and the relays listen and try to decode the messages received at the end of each time slot. Success in the decoding is decided by using the CRC.

During the second phase, the selected node, source or relay, acts as a relay by cooperating with the sources to assist the destination in correctly decoding the messages from all the sources. The selected node transmits, i.e. it cooperates by transmitting the words or a part of the words that it has correctly decoded. The second phase comprises at most $T_{max}$ time slots called rounds. Each round $t \in \{1, \ldots, T_{max}\}$ has a capacity of $N_2$ channel uses.

During this phase, the destination follows a certain strategy to decide on the node which transmits on each time slot (round). The destination informs the nodes by using a control channel with limited bit rate (limited feedback) to transmit a return message. This return message is based on its result in decoding the messages received. The destination thus controls the transmission of the nodes by using these return messages which makes it possible to improve the spectral efficiency and the reliability by increasing the probability of decoding of all of the sources by the destination.

If the decoding of all the sources is correct, the return is a message of ACK type. In this case, the cycle of transmission of a new frame begins with the deletion from the memories of the relays and of the destination and with the transmission by the sources of new messages.

If the decoding of at least one source is errored, the return message is typically a NACK. Each node $a \in S \cup R$ transmits its set of sources correctly decoded at the end of the preceding time slot (round) denoted $S_{a,t-1}$. By convention, $S_{b,t} \subseteq SS$ is used to denote the set of the messages (or sources) correctly decoded by the node $b \in S \cup R \cup \{d\}$ at the end of the time slot t (round t), $t \in \{0, \ldots, T_{max}\}$. The end of the time slot (round) t=0 corresponds to the end of the first phase. The number of time slots used during the second phase $T_{used} = \{1, \ldots, T_{max}\}$ depends on the decoding success at the destination.

The selected node transmits parities determined on the basis of the messages from its set of sources correctly decoded by using a joint network and channel coding (Joint Network Channel Coding). This transmission takes place during a time slot of $N_2$ channel uses. The other nodes and the destination can improve their own decoding by using the transmission of the selected node and consequently update their set of sources correctly decoded.

The initial transmission bit rate of a source s is $R_s = K_s / N_{1,s}$ in bits per complex dimension (b.c.u.) to the total number of channel uses for a number of frames transmitted which tends toward infinity:

$$\tilde{R}_s = \frac{R_s / \alpha_s}{\sum_{i=1}^{M} 1/\alpha_i + \mathbb{E}(T)} \quad (2)$$

with $E(T) = E_{t=1}^{T_{max}} t \Pr\{T=t\}$ the average number of retransmission time slots (rounds) used during the second phase and with $\alpha_i = N_2 / N_{1,i}$.

The spectral efficiency $\eta^{sla}$ can be defined as the sum of individual spectral efficiencies:

$$\eta^{sla} = \Sigma_{s=1}^{M} \tilde{R}_s (1 - \Pr\{O_{s,T_{max}}\}) \quad (3)$$

with $O_{s,T_{max}}$ the event that the source s is not decoded correctly by the destination at the end of the time slot (round) $T_{max}$, hereinafter referred to as individual outage event of the source s at the end of the time slot (round) $T_{max}$.

Generally, the individual outage event of the source $s \in S$ at the end of the time slot (round) t, $O_{s,t}(a_t, S_{a_t,t-1}|h_{dir}, O_{t-1})$ depends on the selected node $a_t \in N = S \cup R$ and on the associated set of decoded sources $S_{a_t,t-1}$, and this in a way that is conditional on the knowledge of the gains of the direct channels $h_{dir}$ and $F_{t-1}$. $F_{t-1}$ is the set comprising all the nodes $\hat{\alpha}_i$ which have been selected in the time slots (rounds) $l \in \{1, \ldots t-1\}$ preceding the time slot (round) t and their associated decoding set $S_{\hat{\alpha}_i,l-1}$ and the decoding set of the destination $S_{d,t-1}$. The common outage event at the end of the time slot (round) t, $\epsilon t(a_t, S_{a_t,t-1}|h_{dir}, O_{t-1})$, is defined as being the event that at least one source is not correctly decoded by the destination at the end of the time slot (round) t.

The probability of the individual outage event of the source s at the end of the time slot (round) t for a candidate node $a_t$ can be expressed in the form: $E(1_{\{O_{s,t}(\alpha_t, S_{a_t}, t-1|h_{dir}, O_{t-1})\}})$ with $E(\cdot)$ the expectation operator and such that the $1_{\{V\}}$ takes the value 1 if the event V is true and the value 0 otherwise.

The probability of the common outage event can be defined in the same way. Hereinafter, the dependency on the knowledge of $h_{dir}$ and of $O_{t-1}$ is omitted in the interests of simplification of the notations.

The common outage event of a set of sources occurs when the vector of their bit rate is outside of the corresponding MAC capacity region.

For some subsets of sources $P \subset \bar{S}_{d,t-1}$ with $\bar{S}_{d,t-1} = S/S_{d,t-1}$, the set of sources not correctly decoded by the destination at the end of the time slot (round) t−1, the common outage event can be expressed in the form:

$$\varepsilon_{t,P}(a_t, S_{a_t,t-1}) = U_{U \subset B} O_{d,P}(u) \quad (4)$$

such that the sources which belong to $l = \bar{S}_{d,t-1}/P$ are considered as interference. $O_{d,P}(U)$ reflects the non-observance of the MAC inequality associated with the sum bit rate of the sources contained in U:

$$\mathcal{F}_{d,B}(\mathcal{U}) = \left\{ \sum_{s \in \mathcal{U}} \frac{R_s}{\alpha_s} > \sum_{s \in \mathcal{U}} \frac{I_{s,d}}{\alpha_s} + \sum_{l=1}^{t-1} I_{\hat{a}_l,d} 1_{\{C_{\hat{a}_l,s}\}} + I_{a_t,d} 1_{\{C_{a_t,s}\}} \right\} \quad (5)$$

In which $$C_{\hat{a}_{i,s}} = \{\{s \in \mathcal{S}_{\hat{a}_i,l-1} \cap \mathcal{U}\} \wedge \{\mathcal{S}_{\hat{a}_i,l-1} \cap \mathcal{J} = \emptyset\}\},$$

$C_{a_{i,s}} = \{\{s \in \mathcal{S}_{a_i,t-1} \cap \mathcal{U}\} \wedge \{\mathcal{S}_{a_i,t-1} \cap \mathcal{J} = \emptyset\}\}$ with $\wedge$ the logic operator.

$I_{a,b}$ the mutual information between the nodes a and b and $\hat{\alpha}_l$, l=1 at t−1 a node already selected. The factor $1/\alpha_s$ makes it possible to normalize before addition the two terms associated respectively with the two phases for which the time slots have respective channel use durations $N_{1,s}$ and $N_2$. The individual outage event of the source s at the end of the time slot (round) t can be written:

$$O_{s,t}(a_t, S_{a_t,t-1}) = \bigcap_{\mathcal{J} \subset \bar{S}_{d,t-1}} \bigcup_{\mathcal{U} \subseteq \mathcal{J}; s \in \mathcal{U}} \left\{ \sum_{s \in \mathcal{U}} \frac{R_s}{\alpha_s} > \sum_{s \in \mathcal{U}} \frac{I_{s,d}}{\alpha_s} + \sum_{i=1}^{t-1} I_{\hat{a}_t,d} 1_{\{C_{\hat{a}_t,s}\}} + I_{a_t,d} 1_{\{C_{d_{a_t},s}\}} \right\}$$  (6)

In which $\bar{I} = \bar{S}_{d,t-1}/1$ and $C_{\hat{a}_t,s}$ and $C_{a_t,s}$ have the same expression as for (5).

According to the invention, the destination implements a link adaptation of slow type. This adaptation consists in maximizing the average utility metric (21), comprising the ratio $\alpha_i = N_2/N_{1,i}$, after a number $T_{used} \leq T_{max}$ of retransmissions (cooperative transmissions) occurring during the second phase subject to the constraint of an average individual BLER for each source.

The utility metric is an average spectral efficiency conditioned on the node selection strategy that takes place during this second phase.

According to a first class of strategies, the selection of the nodes taken from among the sources and the relays depends on the sets of the sources correctly decoded by the nodes. An example considered, called preferred strategy, is based on a selection of IR-HARQ type which aims to maximize the spectral efficiency. According to this preferred strategy, in the time slot (round) t of the second phase, the destination chooses the node with the best instantaneous quality of the link between itself and that node (for example the greatest mutual information between it and that node) taken from among all the nodes which have been able to correctly decode at least one source of the set $\bar{S}_{d,t-1}$, these nodes being called eligible. This strategy makes it possible to achieve a good trade-off between computation complexity and performance level but with the detriment of a significant number of control signals. According to a second class of strategies, the selection of the nodes taken from among the sources and the relays does not depend on the sets of the sources correctly decoded by the nodes. According to this class, the selection is determined and known to all the nodes. One example considered is such that the selection sequence is cyclical and such that the selected node is selected only from among the relays. According to this example, each relay benefits from at least one dedicated time slot (round) during the second phase to transmit. So as not to give preference to one relay over another, the sequence changes on each frame. According to this example, only one return bit from the destination is sufficient to report a common ACK/NACK message.

During the first phase, each source s transmits with the initial bit rate $R_s$.

Let $BLER_{s,T_{used}}(R_s)$ be the average probability of having the message from the source s not decoded correctly after $T_{used}$ time slots (rounds) of the second phase.

In a point-to-point transmission, the individual bit rate (throughput) of the source is given by: $R_s$ ($1-BLER_{s,T_{used}}(R_s, \alpha_s)$) And, to optimize this bit rate, the usual method consists in finding the optimal pair ($R_s$, $BLER_{s,T_{used}}(R_s, \alpha_s)$).

Such a usual method is not usable for a system with M sources, possibly L relays, and a destination with an orthogonal multiple access scheme for the transmission channel since the $BLER_{s,T_{used}}$ is dependent on all the bit rates $(R_1, \ldots, R_M)$ and on all the ratios $\alpha_1, \ldots, \alpha_M$. That stems from the fact that the decoding set of the node selected in the current time slot (round) depends on all the bit rates and all the ratios and that the latter influence the probability of incorrect decoding of the message from the source s.

In order not to overload the notations, we distinguish $\hat{R}_s$, the bit rate of the source s after optimization, from $\bar{R}_i$ which is one possible value of $R_s$ in all of the set of the possible bit rates $\{\bar{R}_1, \ldots, \bar{R}_{n_{MCS}}\}$. $n_{MCS}$ is the number of different MCSs. Similarly, we distinguish $\hat{\alpha}_s$ the ratio of the source s after optimization, from $\bar{\alpha}_i$ which is one possible value of $\alpha_s$ in all of the set of the possible ratios $\{\bar{\alpha}_1, \ldots, \bar{\alpha}_{|A|}\}$.

The method according to the invention is a solution to the following optimization problem:

$$(\hat{R}_1, \ldots, \hat{R}_M, \hat{\alpha}_1, \ldots, \hat{\alpha}_M) = \underset{(R_1, \ldots, R_M) \in \{\bar{R}_1, \ldots, \bar{R}_{n_{MCS}}\}, (\alpha_1, \ldots, \alpha_M) \in \{\bar{\alpha}_1, \ldots, \bar{\alpha}_{|A|}\}^M}{\operatorname{argmax}} \sum_{i=1}^{M} \frac{R_i/\alpha_i}{\sum_{s=1}^{M} 1/\alpha_s + \mathbb{E}(T_{used})} 1 - Pr\{O_{s,T_{used}}\}$$  (7)

subject to the constraint that $Pr\{O_{s,T_{used}}\} \leq QoS_s$, $\forall s \in S$.

In the relationship (7), $T_{used}$ is a random variable which represents the number of time slots (rounds) used during the second phase $T_{used} \leq T_{max}$. The distribution of $T_{used}$ depends on $(R_1, \ldots, R_M)$, on $(\alpha_1, \ldots, a_M)$ and on $Pr\{O_{s,T_{used}}\}$ which renders the multidimensional optimization (7) of cardinality $n_{MCS}{}^M \times |A|^M$ i.e. 91125 (2M)-tuple $(R_1, \ldots, R_M, \alpha_1, \ldots, \alpha_M)$ possible for three sources, a family of fifteen MCSs and three possible values of $\alpha$. An exhaustive search very quickly becomes impossible when the number of sources increases.

Figure 3:
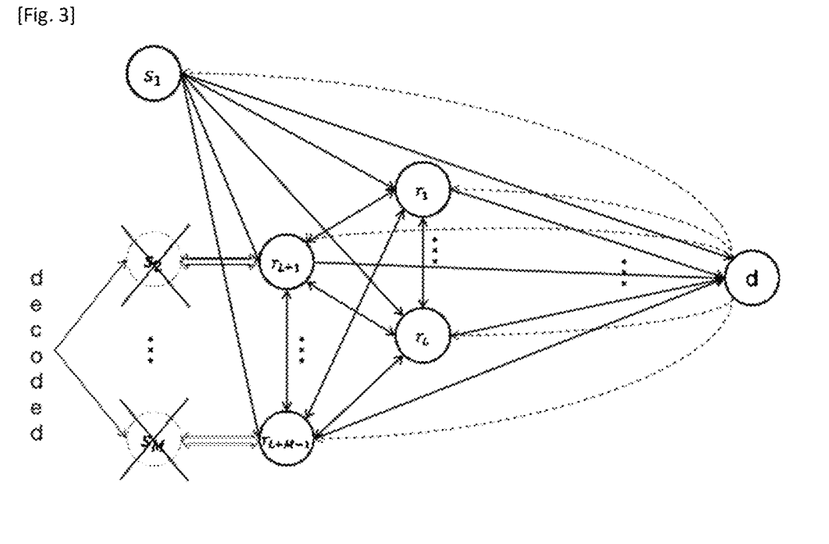
FIG. 3 is a diagram of the OMAMRC system of FIG. 1 for which all the sources except the source $s_1$ are considered to be correctly decoded.

According to one embodiment, the method according to the invention follows a so-called "Genie Aided (GA)" approach which consists in making the hypothesis during the initialization step that all the sources s except the source $s_i$ for which the bit rate is to be initialized are considered to be correctly decoded, $s \in S/s_1\{s_i, s_2, \ldots, s_{i-1} \ldots s_{i-1}, s_{i+1}, \ldots, s_M\}$. All the sources $\{s_1, s_2, \ldots s_{i-1}, \ldots, s_M\}$ other than $s_i$ act as relays denoted $\{r_{L+1}, \ldots, r_{L+M-1}\}$. For the source $s_i$ considered, the network is a network with multiple relays denoted $(1, L+M-1,1)$ and no longer a network with multiple relays and multiple users. The corresponding system is illustrated by the diagram of FIG. 3 when $s_i = s_1$.

The search for the optimal pair $(\hat{R}_s, \hat{\alpha}_s)$ for the source s under the "Genie Aided (GA)" hypothesis is confronted with an additional difficulty over the state of the art in which $N_{1,i} = N_1 \forall i$. In fact, the equation (2) shows that the choice of the bit rate of the source s depends, even under the GA hypothesis, on the ratios $\alpha_i \forall i \in S$. Thus, by making another hypothesis called GA1, a same value $\alpha_{GA}$ of the ratio $\alpha_i$ is set for all the sources as follows: $\alpha_{GA} = \operatorname{argmin}_{\alpha \in A} |\alpha - \alpha_{avg}|$, in which $$\alpha_{avg} = \frac{1}{|A|} \sum_{i=1}^{|A|} \bar{\alpha}_i \text{ with } A = \{\bar{\alpha}_1, \ldots, \bar{\alpha}_{|A|}\}.$$

Finally, the search for the optimal pair $(\hat{R}_s^{GA}, \hat{\alpha}_s^{GA})$ for the source s under the hypotheses GA and GA1 can be written in the form of a single dimensional optimization conditioned on $\hat{\alpha}_s^{GA} = \alpha_{GA}$:

$$\hat{R}_s^{GA} = \operatorname{argmax}_{R_s \in \{\bar{R}_1, \ldots, \bar{R}_{n_{MCS}}\}} \left\{ \frac{R_s}{M + \alpha_{GA} \mathbb{E}(X_{used,R_s})} (1 - BLER_s) \right\} \quad (8)$$

$$BLER_s = \int \left[ R_s > I_{s,d} + \alpha_{GA} \sum_{l=1}^{T_{max}} I_{\hat{a}_l,d} 1_{\{s \in S_{\hat{a}_l,l-1}\}} \right] P(H) dH$$

in which $\hat{R}_s^{GA}$ is the bit rate of the source s after optimization, $R_s$ is the bit rate variable and in which P(H) is the joint probability of the realizations of the channels of all the links of the network. It is clear that the bit rate $R_s$ depends on the selected node d, and therefore on the selection strategy applied by the destination.

A third hypothesis GA2, consisting in considering a strategy of equiprobable random selection of the active node at the time l=1, ..., $T_{max}$ can be adopted, in which $T_{max}$ is the maximum number of retransmissions.

The approximation according to (8) with the hypotheses GA, GA1, GA2 can be calculated by implementing a Monte Carlo process. One mode of implementation is detailed by the algorithm 1 (in the appendix) for the source s, and its principle is as follows.

First of all, the ratios $\alpha_i \forall i \in S$ are all set $\alpha_{GA}$. Then, each bit rate value of the set of possible bit rates $\{\bar{R}_1, \ldots, \bar{R}_{n_{MCS}}\}$ is considered one after the other according to a first loop on i. $n_{MCS}$ is the number of modulation and coding schemes. A second loop on cnt makes it possible to average the individual BLER or $\Pr\{P_{s,T_{max}}\}$ over Nb_MC channel draws according to the statistics given by the average SNRs of all the links. Thus, in the loop cnt, all the channels are known resulting from a random draw. The calculation of the equation (8) is then performed according to a Monte-Carlo process in which the integral is replaced by a sum:

$$\int \left[ R_s > I_{s,d} + \alpha_{GA} \sum_{l=1}^{T_{max}} I_{\hat{a}_l,d} 1_{\{s \in S_{\hat{a}_l,l-1}\}} \right] P(H) dH =$$

$$\frac{1}{Nb\_MC} \sum_{cnt=1}^{Nb\_MC} \left[ R_s > I_{s,d}(H_{cnt}) + \alpha_{GA} \sum_{l=1}^{T_{max}} I_{\hat{a}_l,d}(H_{cnt}) 1_{\{s \in S_{\hat{a}_l,l-1}\}} \right]$$

the out variable of the algorithm 1 corresponding to:

$$\text{out} = \sum_{cnt=1}^{Nb\_MC} \left[ R_s > I_{s,d}(H_{cnt}) + \alpha_{GA} \sum_{l=1}^{T_{max}} I_{\hat{a}_l,d}(H_{cnt}) 1_{\{s \in S_{\hat{a}_l,l-1}\}} \right]$$

The conjunction of the hypotheses GA, GA1 and GA2 makes it possible to obtain a first approximation according to (8) of the initial bit rates and of the ratios $\alpha_i$ of the sources ($\hat{R}_s^{GA}$, $\hat{\alpha}_s^{GA} = \alpha_{GA}$) $\forall s \in S$ which can constitute the initial starting point (iteration 0) of an iterative optimization algorithm known as "Best Response Dynamics" an implementation of which corresponds to the algorithm 2 (in the appendix).

The algorithm 2 is based on a calculation by Monte Carlo simulations of the spectral efficiency $$\eta^{sla}(R_1, \ldots, R_M, \alpha_1, \ldots, \alpha_M) =$$

$$\sum_{i=1}^{M} \frac{R_i/\alpha_i}{\sum_{s=1}^{M} 1/\alpha_s + \mathbb{E}(T_{used})} (1 - BLER_i(R_1, \ldots, R_M, \alpha_1, \ldots, \alpha_M))$$

using the outage events given by the equation (6).

$E(T_{used})$ and $\Pr(O_{s,T_{max}})$ for any $s \in S$ must be evaluated in the Monte Carlo loop as a function of the active node selection strategy by the destination and of the statistics P(H) in a way similar to the algorithm 1.

The calculation of the spectral efficiency $$\eta^{sla}(R_1, \ldots, R_M, \alpha_1, \ldots, \alpha_M) =$$

$$\sum_{i=1}^{M} \frac{R_i/\alpha_i}{\sum_{s=1}^{M} 1/\alpha_s + \mathbb{E}(T_{used})} (1 - BLER_i(R_1, \ldots, R_M, \alpha_1, \ldots, \alpha_M))$$

can follow the process given by the algorithm 3.

The method calculates the $BLER_i$ of the source i and the expectation of the number of retransmissions $E(T_{used})$. According to this embodiment, the method considers that the probability of individual outage is a good approximation of the individual BLER $BLER_i$ of the source i. The probability of the individual outage is the average of the individual outage event given by the equation (6) on the statistics of the links P(H) of the MAMRC system. For a given rate of channel profiles of the MAMRC system and a set of ratios $\{R_1, \ldots, R_M, \alpha_i, \ldots, \alpha_M\}$ conditioned on a selection strategy given by the destination, the method is based on the evaluation of the outage events of the equations (5) and (6) to determine the decoding set at the destination node and the relay nodes. All the sources which are not in the decoding set of the destination after $T_{max}$ retransmissions are declared in outage, that is to say that their error counter is increased by 1.

The algorithm 3 comprises a main part and two subroutines.

The first subroutine is the check_outage(t, $I_{list}$, activated_nodes_list, B) function which takes into account the current time slot t of retransmission and the subset for which the common outage must be calculated for B. This function expresses the event of the equation (4) having for inputs the list of the mutual information between the nodes $I_{list}$ and the selected nodes $\hat{\alpha}_l$ and their set of sources decoded without error $S_{\hat{\alpha}_l,l-1}$ from l=1 to t. Thus, all the subsets O of the subset B should be searched to obtain a result of a decoding set for the subset B. These events are reviewed in the first loop of this function. This function also contains two other loops, one to calculate the sum bit rate of the current subset O and the mutual information included, and another loop to calculate the additional mutual information included as a function of the nodes activated in the retransmission phase.

The second subroutine is the get_decoding_set(t, $I_{list}$, activated_nodes_list) function which determines the decoding set $\alpha_t$ a certain time slot t by taking into account the preceding parameters $I_{list}$ and activated_nodes_list set being determined. The principle of this function is to find the subsets B of maximum cardinality $Card_{max}$ which leads to a common outage event equal to zero. In fact, whatever the source added to B, the associated common outage event is equal to 1 by definition, it is not possible to have multiple subsets with the same cardinalities $Card_{max}$ associated with a common outage event equal to zero. If that were possible, a subset of greater cardinality associated with a common outage event equal to zero would be obtained by effecting the union of these subsets.

The main part comprises four loops. As for the algorithm 1, there is the Monte-Carlo loop such that each of its iterations leads to an individual outage event and an expected retransmission time for the second phase. The functions defined previously are used to check the outage event.

If there is no outage, then the method goes onto a new iteration and the counters of the individual outage events and the expected retransmission time counter do not change.

If there is an outage, then the process starts a second loop, by taking into account the retransmission phase and a certain allocation strategy according to which a certain node is selected to retransmit and is added to the set of the activated nodes. Once an outage event is reached during the time slot of the retransmission phase, the expected retransmission time is updated. Finally, if the number $T_{max}$ of retransmission time slots is reached, the method checks if there is or is not an outage and updates the individual outage event counter of each user accordingly. After the end of the Monte-Carlo loop, the individual BLERs and the expected retransmission time slot time are calculated by means of an average.

The spectral efficiency is then calculated according to the equation (3).

APPENDIX

---

Algorithm 1 - Monte-Carlo approach to determine the bit rates subject to the "Genie Aided" hypothesis of the source s:

---

1. calculation of $\alpha_{GA} : \alpha_{averag} \leftarrow \frac{1}{|A|} \sum_{q=1}^{|A|} \alpha_q$ with $\alpha_q \in \{\tilde{\alpha}_1, \ldots, \tilde{\alpha}_{|A|}\}$ and $\alpha_{GA} = $ $\operatorname{argmin}_{\alpha \in A} |\alpha - \alpha_{avg}|$ 2. $1^{st}$ loop on i from 1 to $n_{MCS}$ 3. $R_s = \overline{R}_i$, the source s adopts the bit rate $\overline{R}_i$ 4. Initialization of the out counter of the Monte Carlo realizations (of channel matrix H which lead to an outage: out = 0, of the counter $\overline{T}_{used}$ of the aggregate number of time slots (rounds) used during the second phase:

$\overline{T}_{used} = 0$ of the set $S_{d,0} = S \setminus s$ according to the "Genie Aided" hypothesis.

5. $2^{nd}$ loop on cnt from 1 to Nb_MC (example Nb_MC-1000)

6.     determine $H_{cnt}$ on the basis of P(H) joint probability of the realizations of the channels of all the links $h_{a,b}$.

7.     calculate $I_{a,b}(H_{cnt})$ for all the links

8.     if $R_s \leq I_{s,d}$ then

9.         $S_{d,0} = S_{d,0} \cup \{s\}$ 10.         continue or return to point 5 (no change of out and $\overline{T}_{used}$ counter values).

11.     end if

12.     $3^{rd}$ loop on t from 1 to $T_{max}$

13.         selection of the node $\hat{\alpha}_t$ by the destination by applying a selection strategy (for example random selection according to the GA2 hypothesis)

14.         calculate $$C_2 = I_{s,d} + \alpha_{GA} \sum_{l=1}^{t} I_{\hat{\alpha}_l, d} \mathbf{1}_{\left\{s \in S_{\hat{\alpha}_l, l-1}\right\}}$$

15.         if $R_s \leq C_2$ then

16.             $T_{used} = t$. (the number of time slots (rounds) used in the current realization of the Monte-Carlo simulation)

17.             break or exit from the $3^{rd}$ loop to go to point 23 (no change of out counter value).

18.         end if

19.         if $t = T_{max}$ then

20.             out = out + 1

21.             $T_{used} = T_{max}$ 22.         end if 23.     end of the $3^{rd}$ loop 24.     $\overline{T}_{used} = \overline{T}_{used} + T_{used}$ 25. end of the $2^{nd}$ loop 26. determine the average outage probability of the source s for the bit rate $\overline{R}_i$:

$$P^{out}_{s,\overline{R}_i} = \frac{out}{Nb\_MC}$$

27. determine the average number of time slots (rounds) used during the second phase:

$$\mathbb{E}\left(T_{used, s, \overline{R}_i}\right) = \frac{\overline{T}_{used}}{Nb\_MC}$$

28. end of the $1^{st}$ loop

-continued

---

Algorithm 1 - Monte-Carlo approach to determine the bit rates
subject to the "Genie Aided" hypothesis of the source s:

---

29. choose the maximum bit rate $R_s$ that the source s can use:

$$\hat{R}_s^{GA} = \text{argmax}_{R_s \in \{\overline{R}_1,\ldots,\overline{R}_{n_{MCS}}\}} \left\{ \frac{R_s}{M + \alpha_{GA}\mathbb{E}(X_{used,R_s})}\left(1 - P_{s,R_s}^{out}\right)\right\}$$

such that $P_{s,R_s}^{out} \leq QoS_s$

---

Algorithm 2 - "Best response dynamics algorithm" (BRD) for each individual BLER subject to
the constraint of QoS $BLER_{QoS,i}$, $\forall\ i \in (1, \ldots, M)$.

---

1. $t \leftarrow 0$ (counter of the number of iterations)
2. Initialize the sets of the ratios and bit rates: $\{\overline{R}_1, \ldots, \overline{R}_{n_{MCS}}\}$ and $\overline{\alpha}_1, \ldots, \overline{\alpha}_{|A|}\}$
3. The bit rates and the ratios $\alpha$ are initialized subject to the hypotheses GA+GA1+GA2:
   $[\hat{R}_1(0), \ldots, \hat{R}_M(0)] \leftarrow [\hat{R}_1^{GA}, \ldots, \hat{R}_M^{GA}]$
   $\hat{\alpha}_i(0) \leftarrow \alpha_{GA}\ \forall\ i \in \{1, \ldots, M\}$
4. $\{\hat{R}_i(-1), \hat{\alpha}_i(-1)\} \leftarrow \{0,0\}\ \forall i \in \{1, \ldots, M\}$ (initialization of the while loop)
5. While $(|\hat{R}_i(t) - \hat{R}_i(t-1)| > \varepsilon_1$ or $\hat{\alpha}_i(t) - \hat{\alpha}_i(t)(t-1)| > \varepsilon_2)$ for a given i from among $i \in \{1, \ldots, M\}$
6. $\quad t \leftarrow t + 1$
7. $\quad$ for $i \leftarrow 1$ at M do (for each source choose the best $(R_i, \alpha_i)$ knowing all the other couples $(\hat{R}_j, \hat{\alpha}_j)\ j \neq i$
8. $\quad \{\hat{R}_i(t)\hat{\alpha}_i(t)\} \leftarrow \text{argmax}_{\{R_i,\alpha_i\}} \eta^{sla}(\{\hat{R}_1(t), \hat{\alpha}_1(t)\}, \ldots, \{\hat{R}_i, \hat{\alpha}_i\}\ \{\hat{R}_{i+1}(t-1), \hat{\alpha}_{i+1}(t-1)\}, \ldots, \{\hat{R}_M(t-1), \hat{\alpha}_M(t-1)\})$
9. $\quad$ Such that $\{BLER_i < BLER_{QoS,1}\}\ \forall\ i \in \{1, \ldots, M\}$ (which satisfies the constraint)
10. $\quad$ End for
11. End while

---

Algorithm 3 Monte-Carlo simulations to determine the spectral efficiency and the BLER events
used in the BDR algorithm:

---

1. $E_{total} = 0$, individual_counter[M]= $\{0,\ldots,0\}$
   initialization of $E_{total}$ number of rounds aggregated in the $2^{nd}$ phase over NB_MC channel drawers
   initialization of the individual_counter[M] table: each individual_counter[i] element aggregates the number of individual outage events for the user i over NB_MC channel drawers
2. $1^{st}$ loop on i from 1 to Nb_MC (example Nb_MC=100)
3. $\quad$ random drawer of $H_i$ on the basis of P(H) the joint probability of the realizations of the channels of all the links $h_{a,b}$
4. $\quad$ calculate $I_{a,b}(H_i)$ for all the links ($I_{a,b}$ is an element of $I_{list}$ for the link between the nodes a and b)
5. $\quad$ initialization of the activated_nodes__list set at $\emptyset$ (list of the selected nodes and of their associated set of sources decoded in the course of the retransmissions)
6. $\quad 2^{nd}$ loop on t from 1 to $T_{max}$
7. $\quad\quad$ out = check_outage(t − 1, $I_{list}$, activated_nodes_list, $\mathcal{S}$);
8. $\quad\quad$ if out = 0 then
9. $\quad\quad\quad S_d = \mathcal{S}$
10. $\quad\quad\quad E_{total} = E_{total} + t − 1$;
11. $\quad\quad\quad$ break or exit from loop 2 to go to point 2:
12. $\quad\quad$ Else
13. $\quad\quad\quad S_d = $ get_decoding_set(t − 1, $I_{list}$, activated_nodes_list);
14. $\quad\quad\quad S_r = $ get_decoding_set(t − 1, $I_{list}$, activated_nodes_list);
15. $\quad\quad\quad S_s = $ get_decoding_set(t − 1, $I_{list}$, activated_nodes_list);
16. $\quad\quad\quad$ selection of the node $\hat{a}_t$ by the destination by applying a selection strategy:
17. $\quad\quad\quad$ addition of $\hat{a}_t$ and of $\mathcal{S}_{\hat{a}_t,t-1}$ associated set of decoded sources to the activated_nodes_list list
18. $\quad\quad\quad$ if $t = T_{max}$ then
19. $\quad\quad\quad\quad E_{total} = E_{total} + T_{max}$
20. $\quad\quad\quad\quad S_d = $ get_decoding_set($T_{max}$, $I_{list}$, activated_nodes_list);
21. $\quad\quad\quad\quad 3^{rd}$ loop on s from 1 to M.
22. $\quad\quad\quad\quad\quad$ if $s \notin S_d$ then
23. $\quad\quad\quad\quad\quad\quad$ individual_counter[s]= individual_counter[s]+1;
24. $\quad\quad\quad\quad\quad$ end if
25. $\quad\quad\quad\quad$ end of the $3^{rd}$ loop
26. $\quad\quad\quad$ end if
27. $\quad\quad$ Else end
28. $\quad$ end of the $2^{nd}$ loop
29. end of the $1^{st}$ loop -continued Algorithm 3 Monte-Carlo simulations to determine the spectral efficiency and the BLER events used in the BDR algorithm:

30. $4^{th}$ loop on s from 1 to M
31. $\Pr\{\mathcal{O}_{s,T_{max}}\}$ = individual_counters[s]/ Nb_MC
32. end of the $4^{th}$ loop
33. $\mathbb{E}(T_{used})$ = $E_{total}$/ Nb_MC
34. Calculation of the spectral efficiency according to the equation (3).

check_outage evaluates the common outage event of the set $\mathcal{B}$
check_outage(t, $I_{list}$, activated_nodes_list, $\mathcal{B}$ );
1. Initialization: out = 0
2. $1^{st}$ loop on j from 1 to ($2^{card}$ −1)(verification of the outage event corresponding to the equation (5), for each subset $\mathcal{U}$ of B)
3. initialization: I = 0, SumRate = 0 and $\mathfrak{T}$ = B\U (initialization of the current mutual information, and of the sum bit rate and of the set of interfering users).
4.   $2^{nd}$ loop on k from 1 to M
5.     if k ∈ $\mathcal{U}$ then
6.       s = k;
7.       I = I +$I_{s,d}/\alpha_s$;
8.       SumRate = SumRate +$R_s/\alpha_s$;
9.     end if
10.    end of the $2^{nd}$ loop
11.  $3^{rd}$ loop on l and a $3^{rd}$ loop on 1 to t (â$_l$ is the node selected in round 1)
12.     if $S_{â_l,l-1} \cap \mathcal{U} \ne \emptyset$ and $S_{â_l,l-1} \cap \mathfrak{T} = \emptyset$ then
13.       I = I +$I_{â_l,d}$
14.     end if
15.   end of the $3^{rd}$ loop
16.  if SumRate > I then
17.     out = 1;
18.   break or exit from the loop 1 to go to the point 21:
19.  end if
20. end of the $1^{st}$ loop
21. return out get_decoding_set calculates the set of sources decoded correctly or the greatest set $\mathcal{B}$ which does not give any common outage
get_decoding_set(t, $I_{list}$, activated_nodes_list);
1. $S_d$ = ∅ (initialization of the decoding set with an empty set)
2. $1^{st}$ loop on card from M to 1 (loop on all the cardinalities of the subsets)
3.   $2^{nd}$ loop on subsets of $C_M^{card}$ at 1 (loop on all the subsets of cardinality card)
4.     Successively choose the subsets of sources: B, in which |B| = card
         out = check_outage(t, $I_{list}$, activated_nodes_list, B);
5.     if out = 0 then
6.       break or exit from the loop 2 to go to point 9:
7.     end if
8.   end of the $2^{nd}$ loop
9.   if out = 0 then
10.     $S_d$ = B
11.    break or exit from the loop 2 to go to the point 13:
12. end of the $1^{st}$ loop
13. return $S_d$

The invention claimed is:

1. A transmission method, implemented by an Orthogonal Multiple-Access Multiple-Relay Channel (OMAMRC) telecommunication system with M sources ($s_1$, . . . , $s_M$), possibly L relays ($r_1$ . . . $r_L$), and a destination (d), M≥2, L≥0, the method comprising:

an initial phase comprising a link adaptation controlled by the destination; and, for each frame to be transmitted, a first phase of successive transmission by the M sources during M time slots of $N_{1,i}$ channel uses per source $s_i$ i∈(1, . . . ,M) and a second phase reserved for one or more cooperative transmissions of $N_2$ channel uses per time slot allocated to one or several nodes taken from among the M sources and the L relays, a use of the channel comprising a time-frequency resource, wherein the one node or the several nodes taken from among the M sources and the L relays are selected according to a selection strategy, wherein, during the initial phase:

the sources are informed by the destination of the values of a ratio of channel uses between the first and second phases determined for each source and of initial bit rates allocated to each source, the number $N_{1,i}$ of channel uses allocated to each source to transmit during the first phase is variable between the sources and is determined by the destination together with the initial bit rates, during the link adaptation by determining a maximum of an average utility function, conditioned on the selection strategy used for selecting the one or several nodes during the second phase, for values of the channel use ratios taken from a finite set of discrete values and subject to the constraint of an average individual Block Error Rate (BLER) for each source.

2. The transmission method as claimed in claim 1, wherein the values of the channel use ratio between the first and second phases determined for each source belong to the finite set of discrete values {1, 0.5, 2}.

3. The transmission method as claimed in claim 1, wherein the maximization of an average utility function subject to the constraint of an average individual BLER for each source is expressed in the form:

$$\left(\hat{R}_{s_i}, \ldots, \hat{R}_{S_M}, \hat{\alpha}_1, \ldots, \hat{\alpha}_M\right) =$$

$$\operatorname{argmax}_{(R_1, \ldots, R_M) \in \{\overline{R}_1, \ldots, \overline{R}_{n_{MCS}}\}, (\alpha_1, \ldots, \alpha_M) \in \{\overline{\alpha}_1, \ldots, \overline{\alpha}_{|A|}\}^M}$$

$$\sum_{i=1}^{M} \frac{R_i/\alpha_i}{\sum_{s=1}^{M} 1/\alpha_s + \mathbb{E}(T_{used})} 1 - Pr\{O_{i,T_{used}}\}$$

subject
to the constraint that $Pr\{O_{s,T_{used}}\} QoS_s$, $\forall s \in S$
with
  $R_i$ a variable representing the initial bit rate allocated to the source i, $i \in \{1, \ldots, M\}$
  $T_{used}$ the number of cooperative transmissions used during the second phase,
  $E(T_{used})$ an average of the number of cooperative transmissions used during the second phase,
  $\alpha_i = N_2/N_{1,i}$ a variable representing the ratio between the number of channel uses during the second phase and the number of uses of the channel during the first phase for the source i, $i \in \{1, \ldots, M\}$,
  $Pr\{O_{s,T_{used}}\} \leq QoS_s$, $\forall s \in S$ the probability of the event of individual outage of the source s at the end of $T_{used}$ being less than a given quality of service $QoS_s$ value.

4. The transmission method as claimed in claim 1, the method being such that the maximization of the average utility metric comprises an initialization of the ratio for each source to the discrete value $(\hat{\alpha}_s^{GA})$ closest to an average of the values of the ratio and determining independently each bit rate of a source by assuming that all messages from the other sources are known to the destination, to obtain initial values of the bit rates.

5. The transmission method as claimed in claim 4, wherein the initial values are modified by using an iterative calculation of the initial bit rates by the destination which takes into account the strategy of selection of the nodes during the second phase.

6. An Orthogonal Multiple-Access Multiple-Relay Channel (OMAMRC) telecommunication system comprising:
  M sources $(s_i, \ldots, s_M)$, L relays $(r_1, \ldots, r_L)$ and a destination (d), wherein M≥2, L≥0, wherein each of the M sources, L relays and the destination comprises a processor and a respective non-transitory computer readable medium comprising instructions stored thereon, which when executed by the respective processors configure the M sources, L relays and the destination to implement a transmission method comprising:
  an initial phase comprising a link adaptation controlled by the destination; and,
  for each frame to be transmitted, a first phase of successive transmission by the M sources during M time slots of $N_{1,i}$ channel uses per source $s_i$ $i \in (1, \ldots M\}$ and a second phase reserved for one or more cooperative transmissions of $N_2$ channel uses per time slot allocated to one or several nodes taken from among the M sources and the L relays, a use of the channel comprising a time-frequency resource, wherein the one node or the several nodes taken from among the M sources and the L relays are selected according to a selection strategy, wherein during the initial phase:
  the sources are informed by the destination of the values of a ratio of channel uses between the first and second phases determined for each source and of initial bit rates allocated to each source,
  the number $N_{1,i}$ of channel uses allocated to each source to transmit during the first phase is variable between the sources and is determined by the destination together with the initial bit rates, during the link adaptation by determining a maximum of an average utility function, conditioned on the selection strategy used for selecting the one or several nodes during the second phase, for values of the channel use ratios taken from a finite set of discrete values and subject to the constraint of an average individual Block Error Rate (BLER) for each source.

7. The OMAMRC telecommunication system as claimed in claim 6, wherein the values of the channel use ratio between the first and second phases determined for each source belong to the finite set of discrete values $\{1, 0.5, 2\}$.

8. The OMAMRC telecommunication system as claimed in claim 6, wherein the maximization of an average utility function subject to the constraint of an average individual BLER for each source is expressed in the form:

$$\left(\hat{R}_{s_i}, \ldots, \hat{R}_{S_M}, \hat{\alpha}_1, \ldots, \hat{\alpha}_M\right) =$$

$$\operatorname{argmax}_{(R_1, \ldots, R_M) \in \{\overline{R}_1, \ldots, \overline{R}_{n_{MCS}}\}, (\alpha_1, \ldots, \alpha_M) \in \{\overline{\alpha}_1, \ldots, \overline{\alpha}_{|A|}\}^M}$$

$$\sum_{i=1}^{M} \frac{R_i/\alpha_i}{\sum_{s=1}^{M} 1/\alpha_s + \mathbb{E}(T_{used})} 1 - Pr\{O_{i,T_{used}}\}$$

subject
to the constraint that $Pr\{O_{s,T_{used}}\} \leq QoS_s$, $\forall s \in S$
with
  $R_i$ a variable representing the initial bit rate allocated to the source i, $i \in \{1, \ldots, M\}$
  $T_{used}$ the number of cooperative transmissions used during the second phase,
  $E(T_{used})$ an average of the number of cooperative transmissions used during the second phase,
  $\alpha_i = N_2/N_{1,i}$ a variable representing the ratio between the number of channel uses during the second phase and the number of uses of the channel during the first phase for the source i, $i \in \{1, \ldots, M\}$,
  $Pr\{O_{s,T_{used}}\} \leq QoS_s$, $\forall s \in S$ the probability of the event of individual outage of the source s at the end of $T_{used}$ being less than a given quality of service $QoS_s$ value.

9. The OMAMRC telecommunication system as claimed in claim 6, wherein the maximization of the average utility metric comprises an initialization of the ratio for each source to the discrete value $(\hat{\alpha}_s^{GA})$ closest to an average of the values of the ratio and determining independently each bit rate of a source by assuming that all messages from the other sources are known to the destination, to obtain initial values of the bit rates.

10. The OMAMRC telecommunication system as claimed in claim 9, wherein the initial values are modified by using an iterative calculation of the initial bit rates by the destination which takes into account the strategy of selection of the nodes during the second phase.

\* \* \* \* \*